(12) United States Patent
Andersson et al.

(10) Patent No.: US 10,730,415 B2
(45) Date of Patent: Aug. 4, 2020

(54) CHILD SAFETY SEAT BRACKET FOR USE IN A VEHICLE

(71) Applicant: Volvo Car Corporation, Göteborg (SE)

(72) Inventors: Rebecca Andersson, Göteborg (SE); Austen Clark, Göteborg (SE); Jonatan Tågerud, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/226,930

(22) Filed: Dec. 20, 2018

(65) Prior Publication Data
US 2020/0198504 A1     Jun. 25, 2020

(51) Int. Cl.
| | |
|---|---|
| B60N 2/26 | (2006.01) |
| B60N 2/90 | (2018.01) |
| B60N 2/28 | (2006.01) |
| B21F 1/00 | (2006.01) |

(52) U.S. Cl.
CPC ............. *B60N 2/2887* (2013.01); *B21F 1/00* (2013.01)

(58) Field of Classification Search
CPC ..... B60N 2/2887; B60N 2/289; B60N 2/2893
USPC .............. 296/68.1; 297/463.1, 250.1, 256.16
See application file for complete search history.

(56) References Cited

U.S. PATENT DOCUMENTS

| | | | | |
|---|---|---|---|---|
| 4,981,313 | A * | 1/1991 | Makamura | E05B 85/045 292/340 |
| 6,108,894 | A * | 8/2000 | Mizuki | B21J 15/02 148/653 |
| 6,155,618 | A * | 12/2000 | Ichinose | E05B 85/045 292/216 |
| 6,582,016 | B1 | 6/2003 | Kirchoff et al. | |
| 6,698,080 | B2 * | 3/2004 | Sawajiri | E05B 85/045 29/509 |
| 6,983,526 | B2 * | 1/2006 | Duffy | B60N 2/286 24/265 CD |
| 7,407,215 | B2 | 8/2008 | Chalhoub | |
| 7,721,406 | B2 | 5/2010 | McCay | |
| 8,100,474 | B2 | 1/2012 | Christ et al. | |
| 8,573,694 | B2 | 11/2013 | Austin et al. | |
| 9,022,340 | B2 | 5/2015 | McLeod et al. | |

(Continued)

OTHER PUBLICATIONS https://www.grandeurfasteners.com/ (Year: 2020).*

*Primary Examiner* — Dennis H Pedder
(74) *Attorney, Agent, or Firm* — Clements Bernard Walker; Christopher L. Bernard (57) ABSTRACT

A bracket assembly, such as a child safety seat bracket assembly, for use in a vehicle and an associated method of manufacture. The bracket assembly includes a wire loop structure that has end portions that are stamped to locally widen the wire loop structure a predetermined distance from ends thereof. These end portions are pressed through cylindrical bores of a bracket structure that is configured to be secured to a seat, interior structure, and/or body of the vehicle, for example. The ends of the wire loop structure are deformed to form retention caps that prevent the end portions of the wire loop structure from backing out of the cylindrical bores of the bracket structure. A child safety seat is selectively secured to one more such wire loop structures, bracket structures, and bracket assemblies to selectively secure the child safety seat to the seat, interior structure, and/or body of the vehicle.

20 Claims, 5 Drawing Sheets

(56) References Cited

U.S. PATENT DOCUMENTS

| | | | |
|---|---|---|---|
| 2002/0089195 A1* | 7/2002 | Sawajiri | E05B 85/045 292/341 |
| 2004/0227384 A1* | 11/2004 | Smallwood | B60N 2/289 297/253 |
| 2004/0261246 A1* | 12/2004 | Duffy | B60N 2/286 29/509 |
| 2005/0168024 A1* | 8/2005 | Duffy | B60N 2/286 297/253 |
| 2017/0282780 A1 | 10/2017 | Wagner et al. | |

* cited by examiner

CHILD SAFETY SEAT BRACKET FOR USE IN A VEHICLE

TECHNICAL FIELD

The present invention relates generally to the automotive field. More specifically, the present invention relates to a bracket assembly, such as a child safety seat bracket assembly or the like, for use in a vehicle and an associated method of manufacture.

BACKGROUND ART

Figure 1:
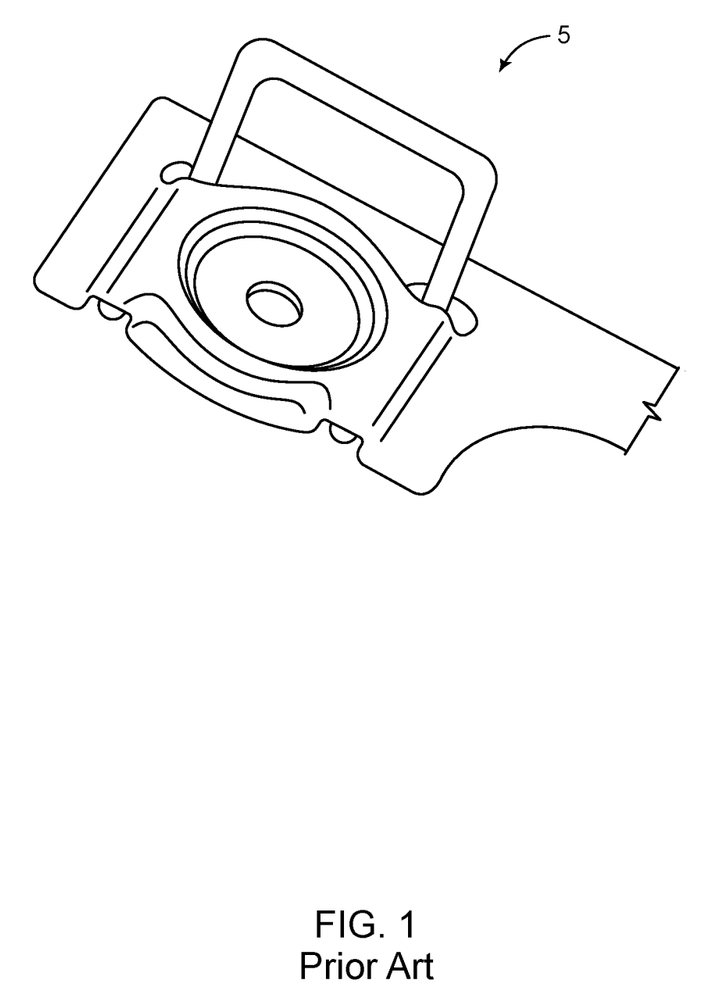
FIG. 1 is a perspective view of a conventional "Isofix" bracket.

Most modern vehicles include an "Isofix" system or the like that provides integrated anchors for securing a child safety seat within the passenger compartment of the associated vehicle. These systems typically include a plurality of bracket assemblies and attachment points that are accessible by a user between the seat bottoms and seat backs of the back seats of the vehicle, for the attachment of the lower buckles of the child safety seat, and near the top portions or in or adjacent to the backs of the seat backs, for the attachment of the top tether of the child safety seat (when used). Such integrated attachment points are far superior to securing the child safety seat within the passenger compartment of the vehicle using the conventional seat belts or the like, minimizing user installation error and greatly enhancing child safety. A conventional "Isofix" bracket 5 is illustrated in FIG. 1.

Each of the bracket assemblies includes a loop or bar, often disposed in a receptacle housing or the like, that is accessible by the user between the seat bottoms and seat backs of the back seats of the vehicle and near the top portions or in or adjacent to the backs of the seat backs. Each of these loops or bars is coupled to a bracket structure that is ultimately coupled to a seat, interior structure, and/or body of the vehicle, such that the child safety seat is ultimately secured to the seat, interior structure, and/or body of the vehicle. Sometimes, often in retrofit applications, the loops or bars are integrally formed with the bracket structures, and all structures are manufactured from the same material. Alternatively, often in original equipment applications, the loops or bars are manufactured from steel wire or tubing and the bracket structures are manufactured from aluminum or the like. In such cases, the loops or bars must be arc welded to the bracket structures. This process is very manual and inefficient, sacrificing component consistency (and potentially safety) and increasing cost.

Thus, what is still needed in the art is an improved bracket assembly or the like and method of manufacture that provides and promotes manufacturing simplicity, consistency, and efficiency.

SUMMARY

The child safety seat bracket assembly provided herein includes both lightweight aluminum and strong steel components that normally require arc welding for sufficient overall strength. Arc welding is problematic because it can be inaccurate, inconsistent, labor intensive, and time consuming. The bracket assembly includes an aluminum body that is bolted to a vehicle and a steel loop that the child safety seat attaches to. Instead of arc welding these components together or using fasteners that could come loose as is normally done, legs of the steel loop pass through bores in the aluminum body. The legs of the steel loop are held in place by stamping them on one side of the bores and pressing them on the other side of the bores. This forms widened points that cannot pass through the bores. This provides the desired strength without arc welding. This method can be applied to the joining of other dissimilar material components as well.

The bracket assembly provided herein includes a wire loop structure that has end portions that are stamped to locally widen the wire loop structure a predetermined distance from ends thereof. These end portions are then pressed through cylindrical bores of a bracket structure that is configured to be secured to a seat, interior structure, and/or body of the vehicle, for example. The ends of the wire loop structure are then deformed to form retention caps that prevent the end portions of the wire loop structure from backing out of the cylindrical bores of the bracket structure. A child safety seat, for example, is selectively secured to one more such wire loop structures, bracket structures, and bracket assemblies to selectively secure the child safety seat to the seat, interior structure, and/or body of the vehicle. Other applications for the bracket assembly and method of manufacture are also contemplated herein.

The bracket assembly includes: a bracket structure defining one or more bores; and an elongate structure having one or more end portions disposed through the one or more bores of the bracket structure, each of the one or more end portions including a first widened portion disposed at a first end thereof adjacent to a first end of the associated bore and a second widened portion disposed at a second end thereof adjacent to a second end of the associated bore. Preferably, the bracket structure includes a pair of bores. Preferably, the elongate structure includes a loop structure having a pair of end portions corresponding to the pair of bores. Optionally, the end portions of the loop structure are disposed substantially perpendicular to a body portion of the loop structure. The first widened portion disposed at the first end of the associated end portion of the elongate structure is formed by stamping the first end of the associated end portion to form a deformed flattened feature at the first widened portion prior to disposing the associated end portion through the associated bore. The second widened portion disposed at the second end of the associated end portion of the elongate structure is formed by pressing the second end of the associated end portion to form a deformed cap feature at the second widened portion subsequent to disposing the associated end portion through the associated bore. The bracket assembly is configured to be secured to one or more of a seat, an interior structure, and a body of a vehicle, and wherein the elongate structure is configured to selectively receive a latch mechanism of a child safety seat disposed in the vehicle.

A vehicle utilizing the bracket assembly includes: an interior structure; a bracket assembly coupled to the interior structure, the bracket assembly including: a bracket structure defining a pair of bores; and an elongate structure having a pair of end portions disposed through the pair of bores of the bracket structure, each of the pair of end portions including a first widened portion disposed at a first end thereof adjacent to a first end of the associated bore and a second widened portion disposed at a second end thereof adjacent to a second end of the associated bore; wherein the elongate structure is configured to selectively receive a latch mechanism of a child safety seat disposed in the vehicle. Preferably, the elongate structure includes a loop structure. Optionally, the end portions of the loop structure are disposed substantially perpendicular to a body portion of the loop structure. The first widened portion disposed at the first end of the associated end portion of the elongate structure is formed by stamping the first end of the associated end portion to form a deformed flattened feature at the first widened portion prior to disposing the associated end portion through the associated bore. The second widened portion disposed at the second end of the associated end portion of the elongate structure is formed by pressing the second end of the associated end portion to form a deformed cap feature at the second widened portion subsequent to disposing the associated end portion through the associated bore.

A method of manufacturing the bracket assembly includes: forming a first widened portion at a first end of a first end portion of an elongate structure; inserting the first end portion of the elongate structure through a first bore defined by a bracket structure; and forming a second widened portion at a second end of the first end portion of the elongate structure, wherein the first widened portion and the second widened portion of the first end portion of the elongate structure are positioned at opposite ends of the first bore defined by the bracket structure. Preferably, the elongate structure includes a loop structure and the method further includes: forming a first widened portion at a first end of a second end portion of the elongate structure; inserting the second end portion of the elongate structure through a second bore defined by the bracket structure; and forming a second widened portion at a second end of the second end portion of the elongate structure, wherein the first widened portion and the second widened portion of the second end portion of the elongate structure are positioned at opposite ends of the second bore defined by the bracket structure. Optionally, the first and second end portions of the loop structure are aligned substantially perpendicular to a body portion of the loop structure. The first widened portion positioned at the first end of the associated end portion of the elongate structure is formed by stamping the first end of the associated end portion to form a deformed flattened feature at the first widened portion prior to inserting the associated end portion through the associated bore. The second widened portion positioned at the second end of the associated end portion of the elongate structure is formed by pressing the second end of the associated end portion to form a deformed cap feature at the second widened portion subsequent to inserting the associated end portion through the associated bore.

Further, a bracket assembly is made from a bracket structure and an elongate structure where the elongate structure is originally shaped as and defined by a U-section and two protruding legs extending laterally from the U-section, the bracket assembly being formed by crimping each protruding leg along the length thereof near the U-section, sliding the protruding legs into open bores disposed on one side of the bracket structure until the open bore ends come into contact with the respective crimped portions of each protruding leg, and then deforming the respective portions of each protruding leg at the opposite open bore ends to secure the elongate structure to the bracket structure between the crimped and deformed portions formed along each protruding leg.

BRIEF DESCRIPTION OF THE DRAWINGS

The present invention is illustrated and described herein with reference to the various drawings, in which like reference numbers are used to denote like assembly components/method steps, as appropriate, and in which.

DESCRIPTION OF EMBODIMENTS

The bracket assembly, such as a child safety seat bracket assembly or the like, provided herein couples components that are typically made of different materials with sufficient overall strength and without the need for conventional arc welding operations or the like, which may be inaccurate, inconsistent, labor intensive, and time consuming. For example, the bracket assembly often includes an aluminum body, providing the desired bracket assembly manufacturing flexibility and weight savings at the point of vehicle attachment, and a steel wire loop, providing the desired bracket assembly strength at the point of child safety seat attachment. The methods provided herein allow these dissimilar components to be joined using only simple, efficient, and repeatable stamping and pressing operations, as opposed to arc welding operations or the like.

More specifically, the bracket assembly provided herein includes a wire loop structure that has end portions that are stamped to locally widen the wire loop structure a predetermined distance from ends thereof. These end portions are then pressed through cylindrical bores of a bracket structure that is configured to be secured to a seat, interior structure, and/or body of the vehicle, for example. The ends of the wire loop structure are then deformed to form retention caps that prevent the end portions of the wire loop structure from backing out of the cylindrical bores of the bracket structure. A child safety seat, for example, is selectively secured to one more such wire loop structures, bracket structures, and bracket assemblies to selectively secure the child safety seat to the seat, interior structure, and/or body of the vehicle. Other applications for the bracket assembly and method of manufacture are also contemplated herein.

Figure 2:
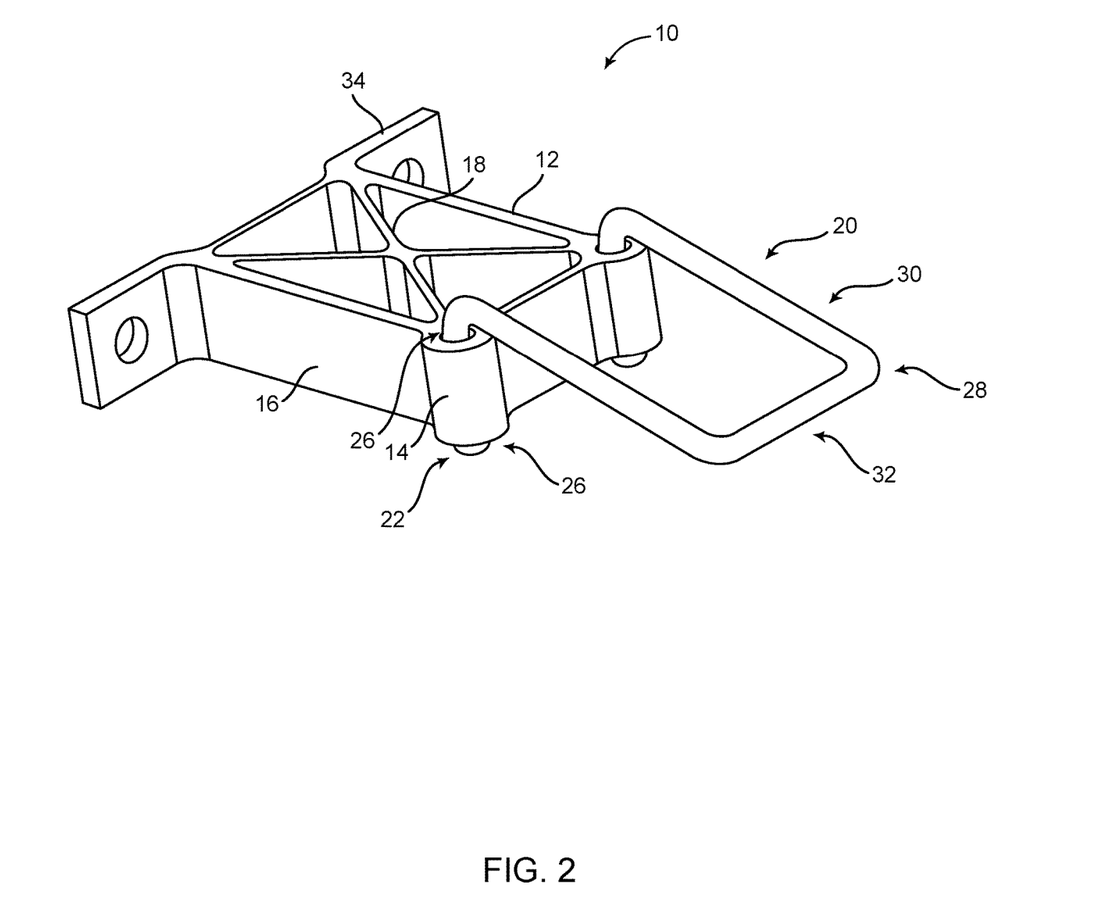
FIG. 2 is a perspective view of one exemplary embodiment of the bracket assembly of the present invention.

Referring now specifically to FIG. 2, in one exemplary embodiment, the bracket assembly 10 includes a bracket structure 12 defining one or more substantially cylindrical and/or keyed bores 14. In this exemplary embodiment, the bracket structure 12 includes a substantially rectangular frame structure 16 reinforced by one or more connecting rib members 18. Alternatively, the bracket structure 12 can include of a simple prismatic or planar structure. In the exemplary embodiment, the one or more substantially cylindrical and/or keyed bores 14 are located at the upper corners of the substantially rectangular frame structure 16 and are disposed substantially perpendicular to the primary plane of the substantially rectangular frame structure 16.

The bracket assembly 10 also includes an elongate structure 20 having one or more end portions 22 disposed through the one or more bores 14 of the bracket structure 12. Preferably, the elongate structure 20 includes a wire or the like having a substantially cylindrical and/or keyed cross-sectional shape that substantially corresponds to the cross-sectional shape of the substantially cylindrical and/or keyed bores 14, at least at the end portions 22 thereof. Each of the one or more end portions 22 includes a first widened portion 24 disposed at a first end thereof adjacent to a first end of the associated bore 14 and a second widened portion 26 disposed at a second end thereof adjacent to a second end of the associated bore 14. Thus, each of the bore structures 14 is secured between the associated widened portions 24 and 26 and rigidly retains the wire 20. Advantageously, forces applied to the first widened portion 24 and the second widened portion 26 are off-axis from forces applied to the elongate structure 20 due to the perpendicular bends of the end portions 22. This enables the widened portions 24,26 to more than adequately accommodate the forces applied to the elongate structure 20.

In the exemplary embodiment, the bracket structure 12 includes a pair of bore structures 14 and the wire 20 forms a loop structure having a pair of end portions 22 corresponding to the pair of bore structures 14. The end portions 22 of the loop structure 20 are disposed substantially perpendicular to a body portion 28 of the loop structure 20, which includes both side members 30 and an end member 32, all formed via bends in the loop structure 20.

The first widened portion 24 disposed at the first end of the associated end portion 22 of the elongate structure 20 is formed by, for example, stamping the first end of the associated end portion 22 to form a deformed flattened feature at the first widened portion 24 prior to disposing the associated end portion 22 through the associated bore 14. In this manner, the first widened portion 24 is press fit into the associated bore 14. The second widened portion 26 disposed at the second end of the associated end portion 22 of the elongate structure 20 is formed by, for example, pressing the second end of the associated end portion 22 to form a deformed cap feature at the second widened portion 26 subsequent to disposing the associated end portion 22 through the associated bore 14. In this manner, the second widened portion 26 forms a rivet-like retention mechanism. It should be noted that either of the widened portions 24 and 26 of the end portions 22 of the elongate structure 20 can be replaced with simple bends, attached retention collars, or the like, provided that such retention structures effectively replace welds and secure the elongate structure 20 to the bracket structure 12 with sufficient strength and limited assembly complexity.

Optionally, the bracket structure 12 is manufactured from a first material, such as aluminum or the like, and the elongate structure 20 is manufactured from a second material, such as steel or the like.

The bracket assembly 10 is configured to be secured to one or more of a seat, an interior structure, and a body of a vehicle, and the elongate structure 20 is configured to selectively receive a latch mechanism of a child safety seat disposed in the vehicle. Other uses are also contemplated herein. For example, a similar bracket assembly could be used as part of a door, hood, or trunk latch, etc. In this exemplary embodiment, the bracket structure 12 includes a plurality of perpendicular flanges 34 extending from the bracket structure 12. Each of the flanges 34 defines a hole by which the bracket assembly 10 is secured to the interior structure of the vehicle or the like. It will be readily apparent to those of ordinary skill in the art that other suitable attachment mechanisms can also be utilized.

Figure 3:
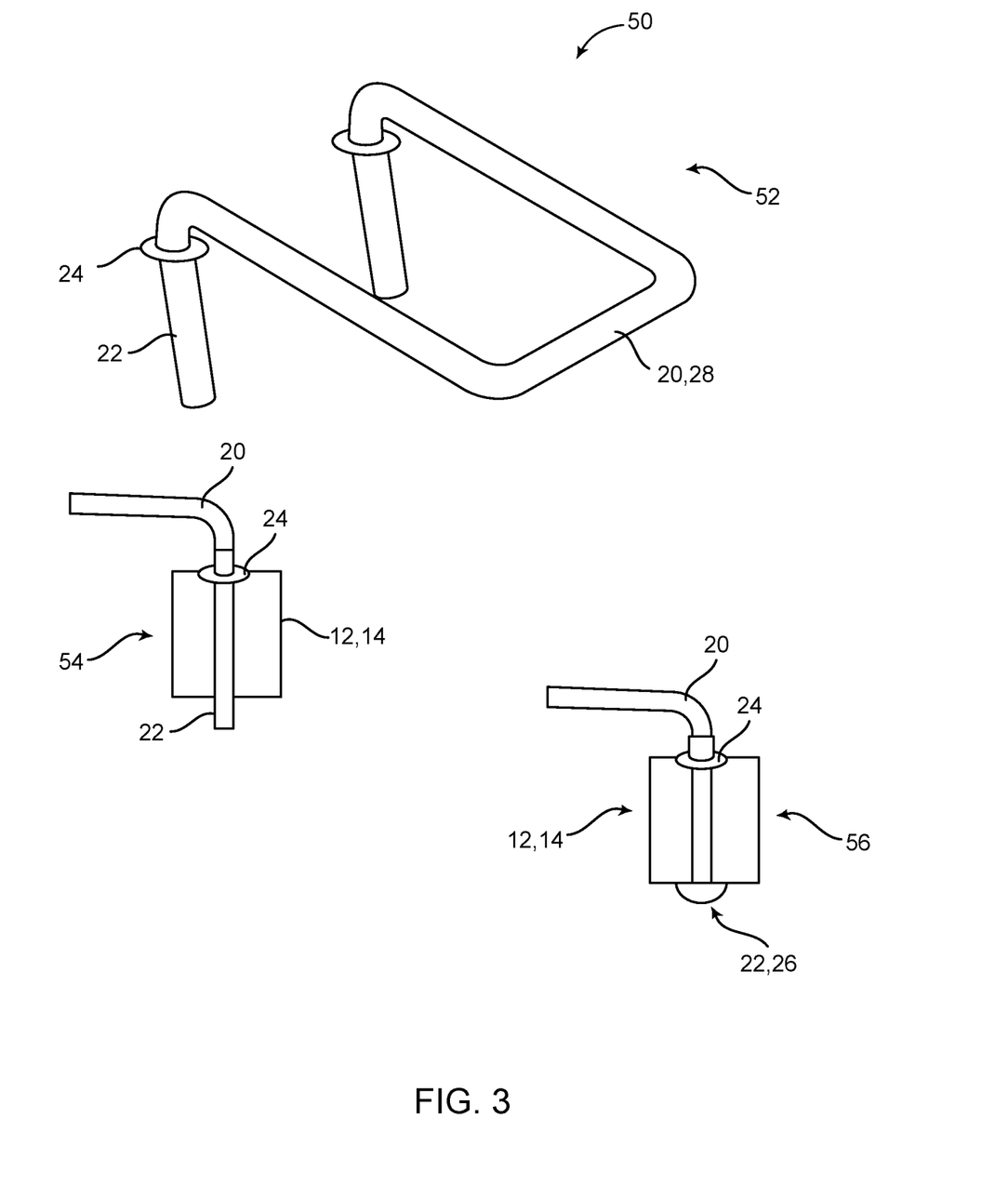
FIG. 3 is a perspective view and series of schematic diagrams illustrating one exemplary embodiment of the method of manufacture of the present invention.

Referring now specifically to FIG. 3, in another exemplary embodiment, the method 50 for manufacturing the bracket assembly 10 of FIG. 2 includes forming the first widened portion 24 at the first end of the first end portion 22 of the elongate structure 20 (step 52), disposing the first end portion of the elongate structure 20 through the first bore 14 defined by the bracket structure 12 (step 54), and forming the second widened portion 26 at the second end of the first end portion 22 of the elongate structure 20 (step 56), with the first widened portion 24 and the second widened portion 26 of the first end portion 22 of the elongate structure 20 disposed at opposite ends of the first bore 14 defined by the bracket structure 12. Preferably, the elongate structure 20 includes the loop structure 28 and the method 50 simultaneously includes forming the first widened portion 24 at the first end of the second end portion 22 of the elongate structure 20 (step 52), disposing the second end portion 22 of the elongate structure 20 through the second bore 14 defined by the bracket structure 12 (step 54), and forming the second widened portion 24 at the second end of the second end portion 22 of the elongate structure 20 (step 56), with the first widened portion 24 and the second widened portion 26 of the second end portion 22 of the elongate structure 20 disposed at opposite ends of the second bore 14 defined by the bracket structure 12.

Optionally, the first and second end portions 22 of the loop structure 20 are disposed substantially perpendicular to the body portion 28 of the loop structure 20. The first widened portion 24 disposed at the first end of the associated end portion 22 of the elongate structure 20 is formed by stamping the first end of the associated end portion 22 to form a deformed flattened feature at the first widened portion 24 prior to disposing the associated end portion 22 through the associated bore 14. The first widened portion 24 ultimately has a thickness that is half of its original thickness, for example. The second widened portion 26 disposed at the second end of the associated end portion 22 of the elongate structure 20 is formed by pressing the second end of the associated end portion 22 to form a deformed cap feature at the second widened portion 26 subsequent to disposing the associated end portion 22 through the associated bore 14.

Again, optionally, the bracket structure 12 is manufactured from a first material, such as aluminum or the like, and the elongate structure 20 is manufactured from a second material, such as steel or the like.

Figure 4:
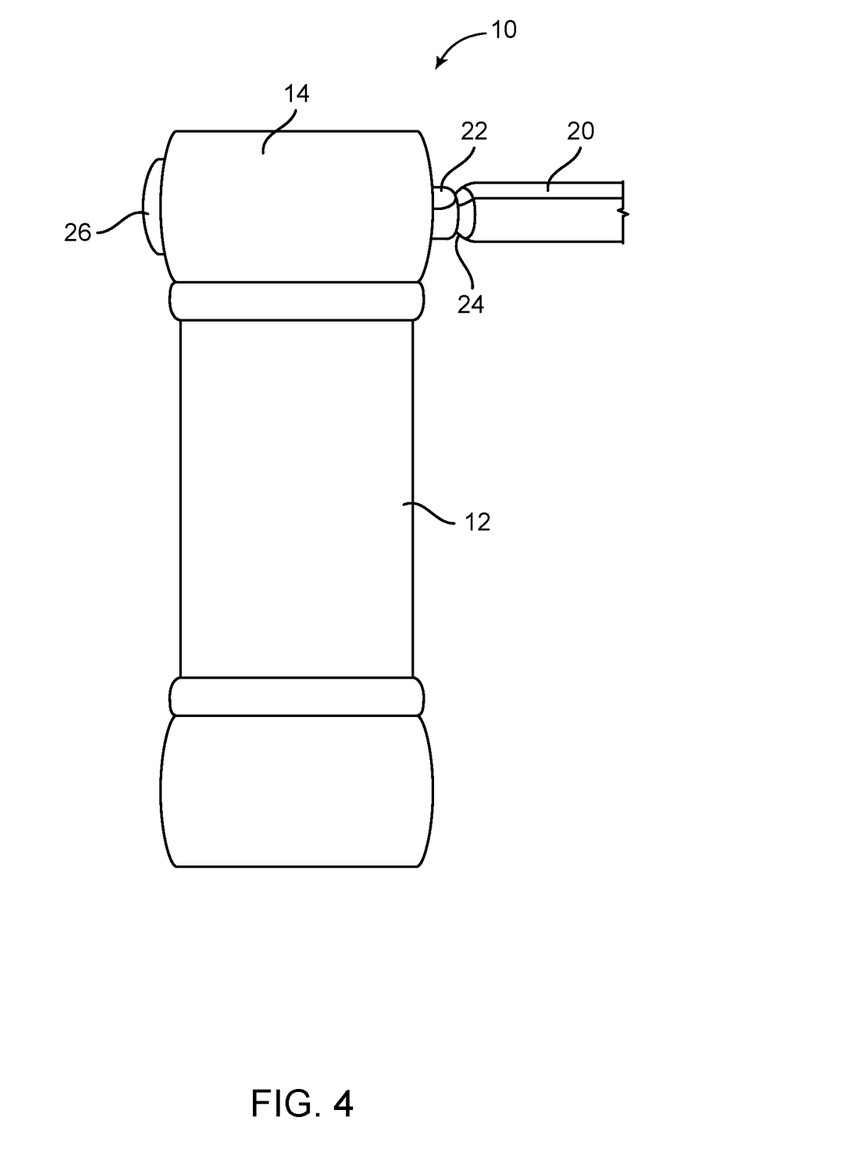
FIG. 4 is a perspective view of an exemplary (i.e., generic) product formed by the method of manufacture of FIG. 3.

FIG. 4 illustrates a generic bracket assembly 10 with one end portion 10 of the elongate wire/loop structure 20 disposed through the associated bore structure 14. The bore structure 14 is secured between the stamped flattened portion 24 and the pressed cap portion 26 of the end portion 22. The stamped flattened portion 24 is essentially press fit partially into the bore 14 and the pressed cap portion 26 acts as a rivet retention mechanism. Collectively, the components of the bracket assembly act as rigid structure that is capable of retaining a load, such as that exerted by a child safety seat in a vehicle braking and/or impact event. This replaces conventional unitary and welded bracket assemblies that are variously weaker, less consistent, more difficult to manufacture, and/or more expensive.

Figure 5:
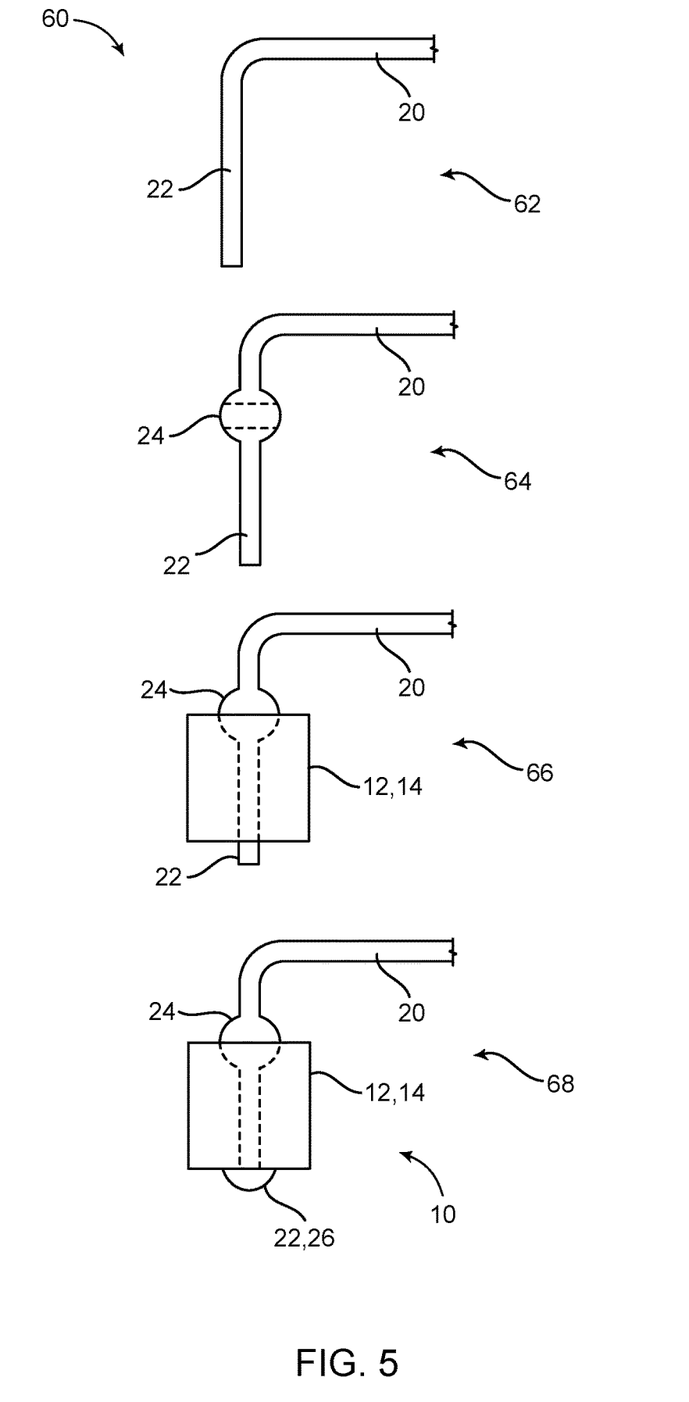
FIG. 5 is a series of schematic diagrams illustrating another exemplary embodiment of the method of manufacture of the present invention.

Referring to FIG. 5, in general, a bracket assembly 10 made from a bracket structure 12 and an elongate structure 20 where the elongate structure 20 is originally shaped as and defined by a U-section 28 and two protruding legs 22 extending laterally from the U-section 28, the bracket assembly 10 being formed by crimping each protruding leg 22 along the length thereof near the U-section 28, sliding the protruding legs 22 into open bores 14 disposed on one side of the bracket structure 12 until the open bore ends come into contact with the respective crimped portions 24 of each protruding leg 22, and then deforming the respective portions of each protruding leg 22 at the opposite open bore ends to secure the elongate structure 20 to the bracket structure 12 between the crimped portion 24 and deformed portion 26 formed along each protruding leg 22.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

The invention claimed is:

1. A bracket assembly, comprising:
a bracket structure defining one or more bores; and
an elongate structure having one or more end portions corresponding to the one or more bores of the bracket structure and disposed through the one or more bores, each of the one or more end portions comprising a first widened portion disposed at a first end thereof adjacent to a first end of the associated bore and a second widened portion disposed at a second end thereof adjacent to a second end of the associated bore, wherein the first widened portion is press fit into the first end of the associated bore.

2. The bracket assembly of claim 1, wherein the bracket structure defines a pair of bores.

3. The bracket assembly of claim 2, wherein the elongate structure comprises a loop structure and the one or more end portions comprise a pair of end portions corresponding to the pair of bores.

4. The bracket assembly of claim 3, wherein the end portions of the loop structure are disposed substantially perpendicular to a body portion of the loop structure.

5. The bracket assembly of claim 1, wherein the first widened portion disposed at the first end of the associated end portion of the elongate structure is formed by stamping the first end of the associated end portion to form a deformed flattened feature at the first widened portion prior to disposing the associated end portion through the associated bore.

6. The bracket assembly of claim 1, wherein the second widened portion disposed at the second end of the associated end portion of the elongate structure is formed by pressing the second end of the associated end portion to form a deformed cap feature at the second widened portion subsequent to disposing the associated end portion through the associated bore.

7. The bracket assembly of claim 1, wherein the bracket structure is manufactured from a first material and the elongate structure is manufactured from a second material.

8. The bracket assembly of claim 1, wherein the bracket assembly is configured to be secured to one or more of a seat, an interior structure, and a body of a vehicle, and wherein the elongate structure is configured to selectively receive a latch mechanism of a child safety seat disposed in the vehicle.

9. A vehicle, comprising:
a bracket assembly, comprising:
a bracket structure defining a pair of bores; and
an elongate structure having a pair of end portions corresponding to the pair of bores of the bracket structure and disposed through the pair of bores, each of the pair of end portions comprising a first widened portion disposed at a first end thereof adjacent to a first end of the associated bore and a second widened portion disposed at a second end thereof adjacent to a second end of the associated bore, wherein the first widened portion is press fit into the first end of the associated bore;
wherein the elongate structure is configured to selectively receive a latch mechanism of a child safety seat disposed in the vehicle.

10. The vehicle of claim 9, wherein the elongate structure comprises a loop structure.

11. The vehicle of claim 10, wherein the end portions of the loop structure are disposed substantially perpendicular to a body portion of the loop structure.

12. The vehicle of claim 9, wherein the first widened portion disposed at the first end of the associated end portion of the elongate structure is formed by stamping the first end of the associated end portion to form a deformed flattened feature at the first widened portion prior to disposing the associated end portion through the associated bore.

13. The vehicle of claim 9, wherein the second widened portion disposed at the second end of the associated end portion of the elongate structure is formed by pressing the second end of the associated end portion to form a deformed cap feature at the second widened portion subsequent to disposing the associated end portion through the associated bore.

14. The vehicle of claim 9, wherein the bracket structure is manufactured from a first material and the elongate structure is manufactured from a second material.

15. A method of manufacturing a bracket assembly, the method comprising:
forming a first widened portion at a first end of a first end portion of an elongate structure;
inserting the first end portion of the elongate structure through a first bore defined by a bracket structure;
press fitting the first widened portion of the first end portion of the elongate structure into the first bore defined by the bracket structure; and
forming a second widened portion at a second end of the first end portion of the elongate structure, wherein the first widened portion and the second widened portion of the first end portion of the elongate structure are positioned at opposite ends of the first bore defined by the bracket structure.

16. The method of claim 15, wherein the elongate structure comprises a loop structure and the method further comprises:
forming a first widened portion at a first end of a second end portion of the elongate structure;
inserting the second end portion of the elongate structure through a second bore defined by the bracket structure;
press fitting the first widened portion of the second end portion of the elongate structure into the second bore defined by the bracket structure; and
forming a second widened portion at a second end of the second end portion of the elongate structure, wherein the first widened portion and the second widened portion of the second end portion of the elongate structure are positioned at opposite ends of the second bore defined by the bracket structure.

17. The method of claim 16, wherein the first and second end portions of the loop structure are aligned substantially perpendicular to a body portion of the loop structure.

18. The method of claim 16, wherein the first widened portion positioned at the first end of the associated end portion of the elongate structure is formed by stamping the first end of the associated end portion to form a deformed flattened feature at the first widened portion prior to inserting the associated end portion through the associated bore.

19. The method of claim 16, wherein the second widened portion positioned at the second end of the associated end portion of the elongate structure is formed by pressing the second end of the associated end portion to form a deformed cap feature at the second widened portion subsequent to inserting the associated end portion through the associated bore.

20. A bracket assembly made from a bracket structure and an elongate structure where the elongate structure is originally shaped as and defined by a U-section and two protruding legs extending laterally from the U-section, the bracket assembly being formed by crimping each protruding leg along the length thereof near the U-section, sliding the protruding legs into open bores disposed on one side of the bracket structure until the open bore ends come into contact with the respective crimped portions of each protruding leg with the crimped portions being press fit partially into the respective open bore ends, and then deforming the respective portions of each protruding leg at the opposite open bore ends to secure the elongate structure to the bracket structure between the crimped and deformed portions formed along each protruding leg.

* * * * *